(12) United States Patent
Chen et al.

(10) Patent No.: US 7,256,961 B2
(45) Date of Patent: Aug. 14, 2007

(54) DAMPED SPINDLE MOTOR FLANGE FOR THE DISK PACK IN A HARD DISK DRIVE

(75) Inventors: Shiao-Hua Chen, Palo Alto, CA (US); Frank Morris, San Jose, CA (US); Joseph Chang, San Jose, CA (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 335 days.

(21) Appl. No.: 10/916,913

(22) Filed: Aug. 11, 2004

(65) Prior Publication Data

US 2006/0034011 A1 Feb. 16, 2006

(51) Int. Cl.
*G11B 17/02* (2006.01)
(52) U.S. Cl. .................................. 360/99.12
(58) Field of Classification Search ........... 360/98.08, 360/99.12
See application file for complete search history.

(56) References Cited

U.S. PATENT DOCUMENTS 4,945,432 A * 7/1990 Matsudaira et al. ..... 360/98.08
6,040,957 A * 3/2000 Konings .................. 360/98.08
2001/0022703 A1 * 9/2001 McCutcheon et al. ... 360/98.08

OTHER PUBLICATIONS

Piezoelectric Ceramic Sensors (PIEZOTITE®), Jun. 2001, 44 pages, Cat.No. P19E-7, Murata Manufacturing Co., Ltd., Japan.

* cited by examiner

*Primary Examiner*—Jefferson Evans
(74) *Attorney, Agent, or Firm*—Earle Jennings; GSS Law Group

(57) ABSTRACT

The present invention includes a spindle motor with a dampened spindle motor flange, which includes a shallow groove on the disk face. The shallow groove includes a first rim, a trough, and a second rim. In use, the trough fills with a visco-elastic material compressed by a metallic ring. A disk pack assembly uses the spindle motor coupling through the dampened spindle motor flange to at least one clamped disk. The invention includes a disk pack using the spindle motor, visco-elastic material, and metallic ring, as well as hard disk drives built with these disk packs. The invention includes the method of disk pack assembly, as well as making a hard disk drive using disk pack. The manufactured disk pack and the hard disk drive are products of the invention's processes.

23 Claims, 3 Drawing Sheets

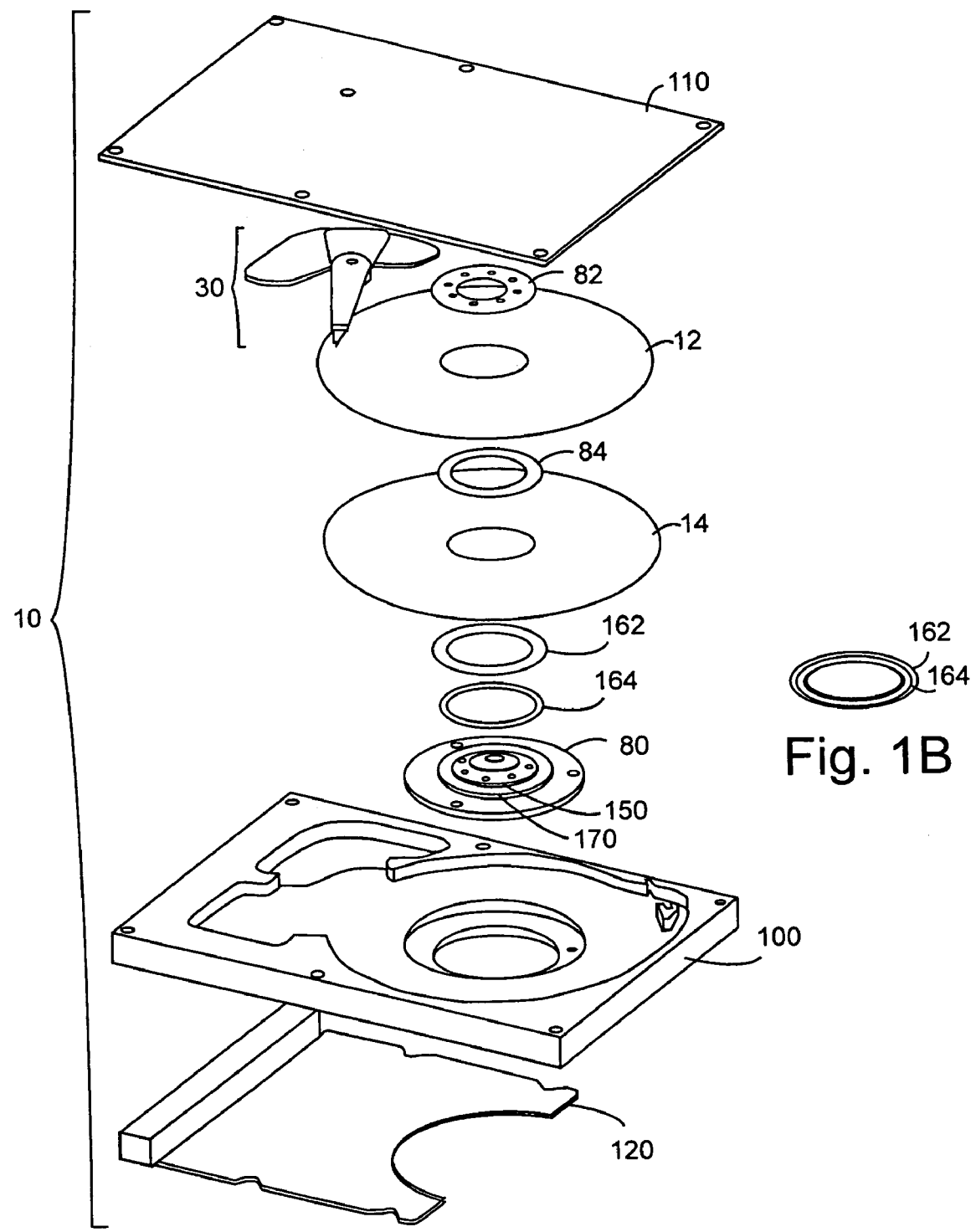
Fig. 1B
Fig. 1A

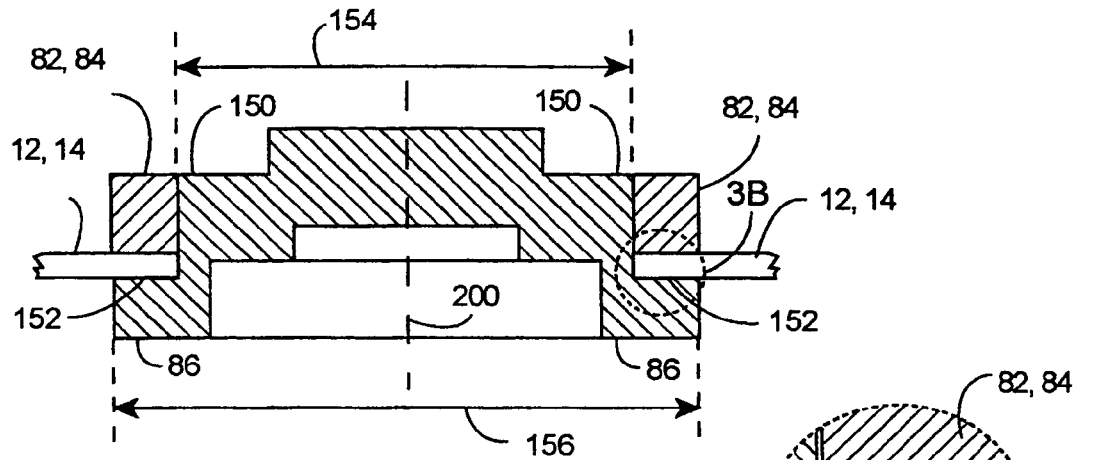
Fig. 3A
Prior Art
Fig. 3B
Prior Art
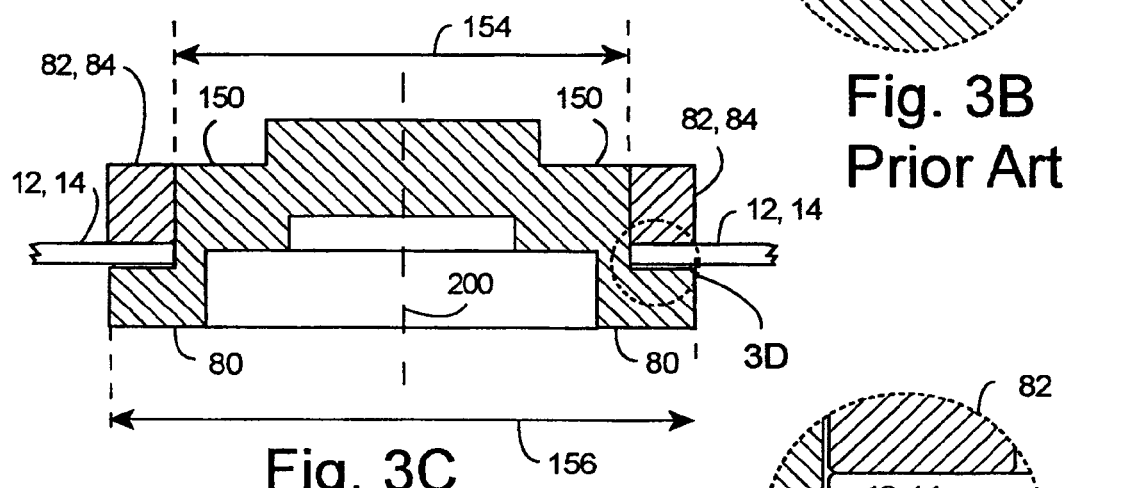
Fig. 3C
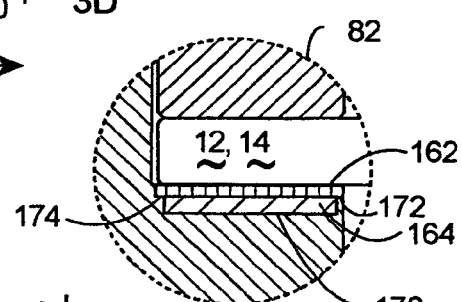
Fig. 3D
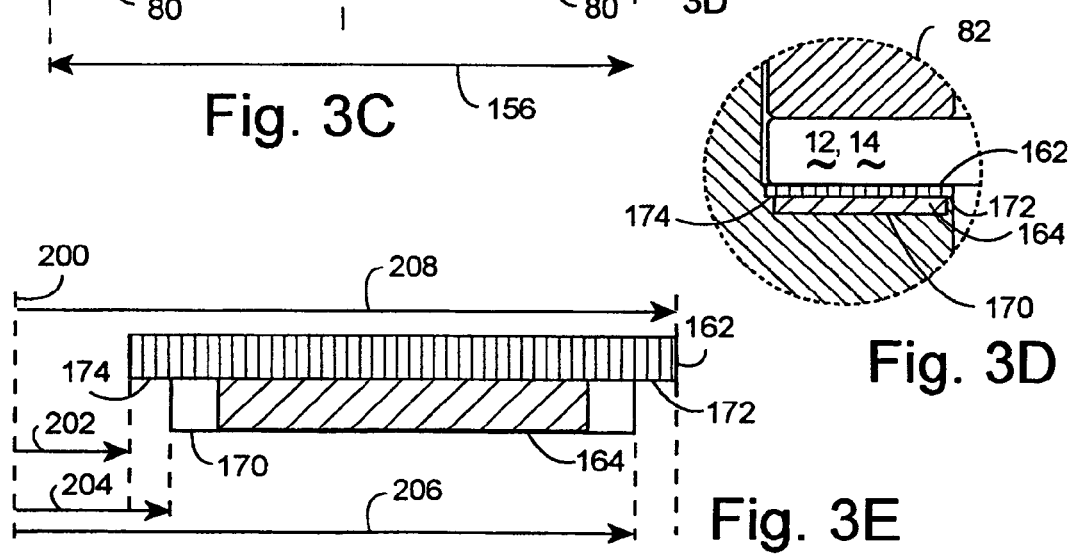
Fig. 3E

DAMPED SPINDLE MOTOR FLANGE FOR THE DISK PACK IN A HARD DISK DRIVE

BACKGROUND OF THE INVENTION

1. Field of the Invention

The present invention relates to spindle motor flanges used in disk packs for a hard disk drive.

2. Background Information

Modern disk drives include a servo controller driving a voice coil actuator to position a read-write head near a track on a rotating disk surface. The read-write head communicates with the servo controller, providing feedback, which is used in controlling the read-write head's positioning near the track. The read-write head is embedded in a slider, which floats on a thin air bearing a very short distance above the rotating disk surface.

Hard disk drives use a quality measure known as the Positional Error Signal (PES), which increases as the data being accessed becomes less reliable. One contribution to the PES comes from instabilities in the rotation of the disk pack driven by the spindle motor. The spindle motor is under the command of the servo controller. A mechanism automatically dampening mechanical vibration for spindle motors is needed.

BRIEF SUMMARY OF THE INVENTION

The present invention includes a spindle motor with a dampened spindle motor flange, which includes a shallow groove on the disk face. The shallow groove includes a first rim, a trough, and a second rim.

In use, the trough fills with a visco-elastic material compressed by a metallic ring. A disk pack assembly uses the spindle motor coupling through the dampened spindle motor flange to at least one clamped disk. The dampened spindle motor flange acts to dampen mechanical vibrations between spindle motor and coupled disk(s).

The visco-elastic material may be part of the metallic ring, or they may be separate.

Preferably, the assembled metallic ring and spindle motor flange form a metal-to-metal contact.

The invention includes a disk pack using the spindle motor, visco-elastic material, and metallic ring, as well as hard disk drives built with these disk packs.

The invention includes the method of disk pack assembly, as well as making a hard disk drive using disk pack. The manufactured disk pack and the hard disk drive are products of the invention's processes.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1A shows an exploded view of the primary mechanical components of a hard disk drive incorporating the invention's spindle motor, its visco-elastic material and its metallic ring.

FIG. 1B shows the visco-elastic material formed on the metallic ring, both of FIG. 1A.

FIG. 3A shows a cross section of the coupling of a disk with a spindle motor of the prior art;

FIG. 3B shows a detail of FIG. 3A;

FIG. 3C shows a cross section of the spindle motor coupling through the shallow groove filled with the visco-elastic material compressed by the metallic ring and coupling to the disk of FIGS. 1A, 1B-2C;

FIG. 3D shows a detail of FIG. 3C; and

FIG. 3E shows a cross section of the visco-elastic material and metallic ring in relation to the first rim, the trough, and the second rim of FIG. 3D.

DETAILED DESCRIPTION

Figure 2A:
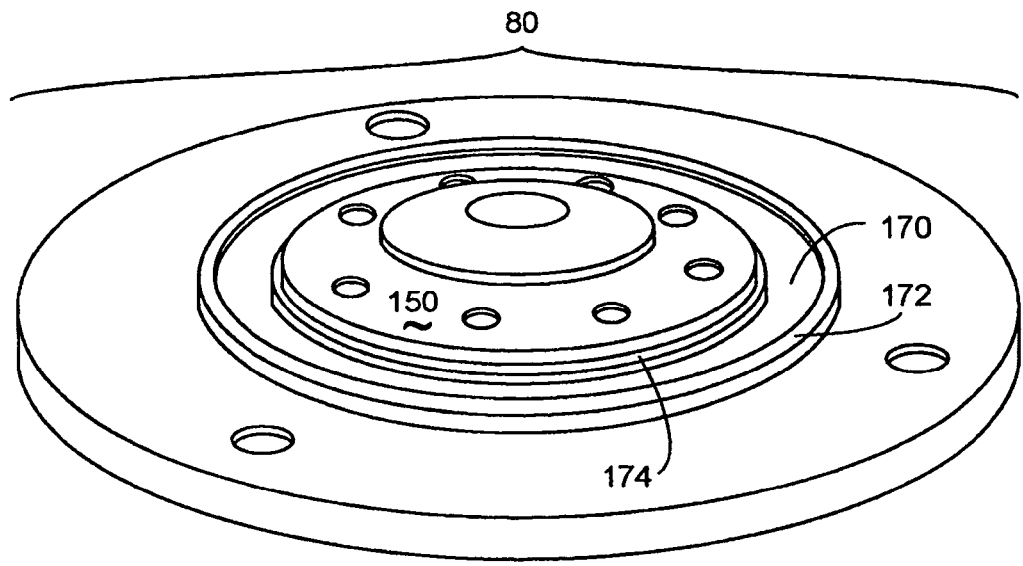
FIG. 2A further shows the invention's spindle motor of FIG. 1A forming a shallow groove including the first rim, the trough and the second rim.

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

FIG. 1A shows an exploded schematic view of the primary mechanical components of a hard disk drive 10 incorporating the invention's spindle motor 80, the visco-elastic material 164 and the metallic ring 162.

The disk pack of FIG. 1A includes the invention's spindle motor 80, the visco-elastic material 164 and the metallic ring 162, at least one of the disks 12 and 14, a disk clamp 82, and possibly a disk spacer 84.

The hard disk drive 10 of FIG. 1A also includes a printed circuit board assembly 120, a disk drive base 100, a voice coil actuator 30, and a disk drive cover 110, as well as the disk pack.

FIG. 1B shows the visco-elastic material 164 formed on the metallic ring 162, both of FIG. 1A. The visco-elastic material 164 may be bonded to the metallic ring 162. Alternatively, visco-elastic material 164 may be deposited on the metallic ring 162 in at least one layer. In certain embodiments, it may be preferred that there are two layers of visco-elastic material 164 deposited on the metallic ring 162.

As used herein, the metallic ring 162 may preferably be primarily composed of a non-out gassing metal. Further preferred, the non-out gassing metal is a form of steel. Further preferred, the non-out gassing metal is a form of stainless steel.

As used herein, the visco-elastic material 164 is preferably, primarily composed of a viscous elastomer. Further preferred, the visco-elastic material 164 is primarily composed of a polymer known as "3M242".

FIG. 2A further shows the invention's spindle motor of FIG. 1A forming a shallow groove including the first rim 174, the trough 170, and the second rim 172.

Figure 2B:
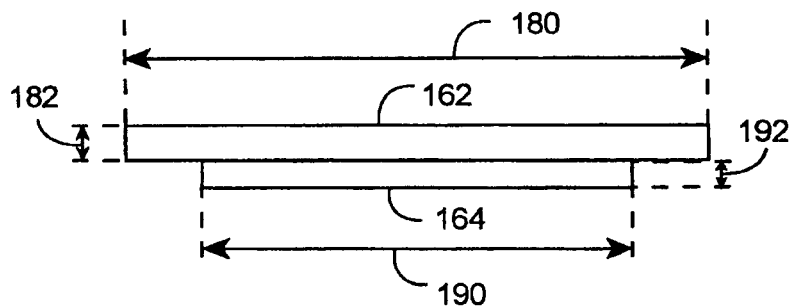
FIG. 2B shows a side view of the visco-elastic material and the metallic ring of FIG. 1B.
Figure 2C:
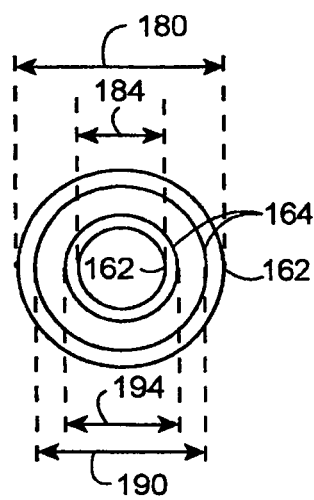
FIG. 2C shows a bottom view of the visco-elastic material and the metallic ring of FIGS. 1B and 2B.

FIGS. 2B and 2C show side and bottom views of the visco-elastic material 164 and the metallic ring 162 of FIG. 1B. The reference number 180 denotes the outer diameter of the metallic ring 162. The reference number 182 denotes the thickness of the metallic ring 162. The reference number 184 denotes the inner diameter of the metallic ring 162. The reference number 190 denotes the outer diameter of the visco-elastic material 164. The reference number 192 denotes the thickness of the visco-elastic material 164. The reference number 194 denotes the inner diameter of the visco-elastic material 164.

FIG. 3A shows a cross section of the coupling of a disk 12 or 14 with a spindle motor 86 of the prior art. FIG. 3B shows a detail of FIG. 3A.

In FIGS. 3A to 3D, the spindle motors 86 and 80 rotate about the principal axis 200. Both spindle motor flanges are symmetric about the principal axis 200. Both flanges include the ridge 150, which includes several screw holes as shown in FIG. 1A. The vertical edges of ridge 150 approximate 154 the inside diameter of the disks 12 or 14, to be used in the hard disk drive 10. One common preferred inside diameter 154 is 25 mm. The flange diameter 156 varies between specific embodiments, but may preferably be in the range of 28 to 36 mm. The flange diameter 156 may further be preferably between 30 and 34 mm. The flange diameter 156 may be further preferred to be within five percent of 32 mm.

FIG. 3C shows a cross section of the spindle motor 80 coupling through the shallow groove filled with the visco-elastic material 164 compressed by the metallic ring 162 and coupling to the disk 12 or 14 of FIGS. 1A, 1B-2C. FIG. 3D shows a detail of FIG. 3C, where the shallow groove includes the first rim 174, the trough 170 and the second rim 172.

FIG. 3E shows a cross section of the visco-elastic material 164 and metallic ring 162 in terms of the first rim 174, the trough 170, and the second rim 172. FIG. 3E shows the visco-elastic material 164 not filling the trough 170, which would indicate the conditions before the metallic ring 162 compresses the visco-elastic material 164. An advantage the invention provides through the metal rim contacting the metal flange is a minimization of the effects of viscoelastic creep, which may occur over time in the prior art. Reference 202 refers to the radial distance from the principal axis 200 to the inside edge of the first rim 174. Reference 204 refers to the radial distance from the principal axis 200 to the outside edge of the first rim 174. Reference 206 refers to the radial distance from the principal axis 200 to the inside edge of the second rim 172. Reference 208 refers to the radial distance from the principal axis 200 to the outside edge of the second rim 172.

As used herein, a rim length is a radial distance about said principal axis starting at said inside edge of said first rim to said outside edge of said second rim. The rim length is the radial distance 202, subtracted from the radial distance 208.

As used herein, a trough length is a radial distance about said principal axis from the boundary of said trough with said first rim to the boundary of said trough with said second rim. The trough length is the radial distance 204, subtracted from radial distance 206. In general, the rim length is greater than the trough length.

Any of the following may be preferred: The trough length is at least 65% of the rim length. The trough length is at most 90% of the rim length.

Any of the following may be further preferred: The trough length is at most 85% of the rim length. The trough length is at least 75% of the rim length.

The disk pack is made by coupling said spindle motor 80, through said trough 170 filled with said visco-elastic material 164 compressed by said metallic ring 162, to said disk 12 or 14. This operation is shown in FIGS. 3C and 3D. The disk pack includes at disk clamp 82 coupled to this assembly to clamp it together. Alternatively, more than one disk may be included in the disk pack, separated by a disk spacer 84, which is partially shown in FIGS. 3C and 3D.

As shown in FIG. 1A, the hard disk drive 10 is made by mounting the disk pack and the housing. The housing of the hard disk drive 10 includes disk drive cover 110 and a disk drive base 100 with printed circuit board assembly 120, to form the housing of the hard disk drive 10.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A disk pack for use in a hard disk drive, comprising:
a spindle motor comprising a principal axis and a dampened spindle motor flange, further comprising a disk face including a shallow groove symmetrically arranged about said principal axis; wherein said shallow groove includes a first rim joined to a trough joined to a second rim;
wherein said first rim is closer to said principal axis than said trough and said trough is closer to said principal axis than said second rim;
wherein said trough has a depth of at least 0.5 millimeters (mm); and
wherein said disk pack, further comprises:
a metallic ring included at least one layer of a visco-elastic material composed primarily of a partially viscous elastomer deposited on said metallic ring; and
said spindle motor coupling said shallow groove filled with said layer of said visco-elastic material through compression of said visco-elastic material, in said trough, by said metallic ring to a disk; wherein said layer of said visco-elastic material has a thickness of at least 0.05 mm more than said trough before said compression.

2. The apparatus of claim 1, wherein said depth of said trough is at most 0.125 mm.

3. The apparatus of claim 1, wherein said depth of said trough is at least 0.075 mm.

4. The apparatus of claim 1, wherein a rim length is a radial distance about said principal axis starting at said inside edge of said first rim to said outside edge of said second rim;
wherein a trough length is a radial distance about said principal axis from the boundary of said trough with said first rim to the boundary of said trough with said second rim; and
wherein said rim length is greater than said trough length.

5. The apparatus of claim 4, wherein said trough length is at least sixtyfive percent of said rim length.

6. The apparatus of claim 5, wherein said trough length is at most ninety percent of said rim length.

7. The apparatus of claim 6, wherein said trough length is at most eightyfive percent of said rim length.

8. The apparatus of claim 5, wherein said trough length is at least seventyfive percent of said rim length.

9. The apparatus of claim 4, wherein said visco-elastic material compresses to essentially fill said trough.

10. The apparatus of claim 1, wherein said thickness of said layer is at most 0.15 mm more than said depth of said trough before compression.

11. The apparatus of claim 10, wherein said thickness of said layer is at most 0.12 mm more than said depth of said trough before compression.

12. The apparatus of claim 1, wherein said thickness of said layer is at least 0.08 mm more than said depth of said trough before compression.

13. The apparatus of claim 1, wherein said metallic ring is primarily composed of a non-out gassing metal.

14. The apparatus of claim 13, wherein said non-out gassing metal is a form of steel.

15. The apparatus of claim 14, wherein said non-out gassing metal is a form of stainless steel.

16. The apparatus of claim 1, wherein said visco-elastic material is composed primarily of a polymer known as "3M242".

17. The apparatus of claim 1, wherein a thickness of said metallic ring is at least 0.15 mm.

18. The apparatus of claim 17, wherein said thickness of said metallic ring is at most 0.35 mm.

19. The apparatus of claim 18, wherein said thickness of said metallic ring is at most 0.30 mm.

20. The apparatus of claim 17, wherein said thickness of said metallic ring is at least 0.20 mm.

21. The apparatus of claim 1, wherein said visco-elastic material is deposited on said metallic ring in at least two of said layers.

22. The hard disk drive, comprising: said disk pack of claim mounted in a housing.

23. A disk pack for use in a hard disk drive, comprising:
a spindle motor comprising a principal axis and a dampened spindle motor flange, further comprising a disk face including a shallow groove symmetrically arranged about said principal axis; wherein said shallow groove includes a first rim joined to a trough joined to a second rim;

wherein said first rim is closer to said principal axis than said trough and said trough is closer to said principal axis than said second rim;

wherein said trough has a depth of at least 0.5 millimeters (mm); and wherein said disk pack, further comprises:

a metallic ring including at least one layer of a visco-elastic material composed primarily of a polymer known as "3M242" bonded to said metallic ring; and said spindle motor coupling said shallow groove filled with said layer of said visco-elastic material through compression of said visco-elastic material, in said trough, by said metallic ring to a disk; wherein said layer of said visco-elastic material has a thickness of at least 0.05 mm more than said trough before said compression.

* * * * *